US010344154B2

(12) United States Patent
Wu et al.

(10) Patent No.: US 10,344,154 B2
(45) Date of Patent: Jul. 9, 2019

(54) THERMOPLASTIC VULCANIZATE INCLUDING A BLOCK COMPOSITE

(71) Applicant: Dow Global Technologies LLC, Midland, MI (US)

(72) Inventors: Xiaosong Wu, Sugar Land, TX (US); Colin Li Pi Shan, Pearland, TX (US); Kim L. Walton, Lake Jackson, TX (US); Gary R. Marchand, Maurepas, LA (US)

(73) Assignee: Dow Global Technologies LLC, Midland, MI (US)

( * ) Notice: Subject to any disclaimer, the term of this patent is extended or adjusted under 35 U.S.C. 154(b) by 78 days.

(21) Appl. No.: 15/538,953

(22) PCT Filed: Dec. 11, 2015

(86) PCT No.: PCT/US2015/065232
§ 371 (c)(1),
(2) Date: Jun. 22, 2017

(87) PCT Pub. No.: WO2016/105977
PCT Pub. Date: Jun. 30, 2016

(65) Prior Publication Data
US 2017/0369691 A1 Dec. 28, 2017

Related U.S. Application Data

(60) Provisional application No. 62/096,013, filed on Dec. 23, 2014.

(51) Int. Cl.
*C08L 23/14* (2006.01)
*C08L 23/16* (2006.01)
*C08L 53/00* (2006.01)
*C08F 297/08* (2006.01)

(52) U.S. Cl.
CPC .......... *C08L 23/16* (2013.01); *C08F 297/083* (2013.01); *C08L 23/14* (2013.01); *C08L 53/00* (2013.01)

(58) Field of Classification Search
CPC ....... C08F 297/083; C08L 23/16; C08L 53/00
See application file for complete search history.

(56) References Cited

U.S. PATENT DOCUMENTS

| | | |
|---|---|---|
| 4,299,931 A | 11/1981 | Coran et al. |
| 5,936,039 A | 8/1999 | Wang et al. |
| 6,100,334 A | 8/2000 | Abdou-Sabet |
| 6,268,444 B1 | 7/2001 | Klosin et al. |
| 6,288,171 B2 | 9/2001 | Finerman et al. |
| 6,297,301 B1 | 10/2001 | Erderly et al. |
| 6,395,671 B2 | 5/2002 | LaPointe |
| 6,399,710 B1 | 6/2002 | Finerman et al. |
| 6,946,522 B2 | 9/2005 | Jacob et al. |
| 8,476,366 B2 | 7/2013 | Walton et al. |
| 8,486,878 B2 | 7/2013 | Li Pi Shan et al. |
| 8,569,422 B2 | 10/2013 | Shan et al. |
| 8,716,400 B2 | 5/2014 | Carnahan et al. |
| 2003/0004286 A1 | 1/2003 | Klosin et al. |
| 2004/0010103 A1 | 1/2004 | Boussie et al. |
| 2006/0116474 A1 | 6/2006 | Jarus et al. |
| 2006/0199906 A1 | 9/2006 | Walton et al. |
| 2006/0199910 A1 | 9/2006 | Walton et al. |
| 2007/0213431 A1 | 9/2007 | Adur |
| 2010/0093964 A1 | 4/2010 | Van Damme et al. |
| 2011/0082258 A1 | 4/2011 | Walton et al. |
| 2012/0208962 A1 | 8/2012 | Walton et al. |
| 2014/0309358 A1 | 10/2014 | Jacob et al. |
| 2015/0210838 A1 | 7/2015 | Wu et al. |

FOREIGN PATENT DOCUMENTS

| | | |
|---|---|---|
| WO | 2003/040195 A1 | 5/2003 |
| WO | 04/024740 A1 | 3/2004 |
| WO | 2007/035485 A1 | 3/2007 |

OTHER PUBLICATIONS

PCT/US2015/065232, International Search Report and Written Opinion dated Mar. 8, 2016.
PCT/US2015/065232, International Preliminary Report on Patentability dated Jul. 6, 2017.
PCT/US2015/065206, International Search Report and Written Opinion dated Mar. 8, 2016.
PCT/US2015/065206, International Preliminary Report on Patentability dated Jul. 6, 2017.

*Primary Examiner* — Jeffrey C Mullis (57) ABSTRACT

A thermoplastic vulcanizate composition includes (A) greater than 15 wt % of a block composite that has (i) an ethylene/alpha-olefin/diene interpolymer in which the alpha-olefin is an alpha olefin monomer having from 3 to 10 carbon atoms and the diene is a diene monomer having from 2 to 25 carbon atoms, (ii) a propylene based polymer, and (iii) a block copolymer comprising a soft block and a hard block in which the soft block has the same composition as the ethylene/alpha-olefin/diene polymer and the hard block has the same composition as the propylene based polymer; and (B) a remainder of a curative system and optionally at least one of a vulcanizable elastomer, a thermoplastic polyolefin, and an oil.

10 Claims, 2 Drawing Sheets

THERMOPLASTIC VULCANIZATE INCLUDING A BLOCK COMPOSITE

FIELD

Embodiments relate to a block composite that includes a propylene based polymer, an ethylene/alpha-olefin/diene polymer, and a block copolymer having a propylene block and an ethylene/alpha-olefin/diene block for use in thermoplastic vulcanizates, articles incorporating thereof, and methods of manufacturing thereof.

INTRODUCTION

A thermoplastic vulcanizate (TPV) may include finely-dispersed rubber particles in a thermoplastic matrix. The physical properties of a TPV may be affected by many factors including, e.g., the molecular structure of the rubber phase, the properties of the thermoplastic matrix, cure level, and/or the presence of fillers. A TPV composition that includes a vulcanizable elastomer (rubber), a thermoplastic polyolefin, and a block copolymer having a "soft" segment and a "hard" segment to enhance properties thereof is discussed in, e.g., U.S. Pat. No. 8,476,366. However, a need exists to be able to utilize a single block composite (and the enhanced properties associated therewith) including a diene (and the properties associated therewith) to act similar to individual components of a TPV composition to enhance cross-linking among components, enhance compression set (e.g., at a comparable Shore A hardness), and/or simplify a method of manufacturing TPV compositions/articles (e.g., by reducing the total number of components that are required in a TPV formulation).

SUMMARY

Embodiments may be realized by providing a thermoplastic vulcanizate composition that includes (A) greater than 15 wt % of a block composite that has (i) an ethylene/alpha-olefin/diene interpolymer in which the alpha-olefin is an alpha-olefin monomer having from 3 to 10 carbon atoms and the diene is a diene monomer having from 2 to 25 carbon atoms, (ii) a propylene based polymer, and (iii) a block copolymer comprising a soft block and a hard block in which the soft block has the same composition as the ethylene/alpha-olefin/diene polymer and the hard block has the same composition as the propylene based polymer; and (B) a remainder of a curative system and optionally at least one of a vulcanizable elastomer, a thermoplastic polyolefin, and an oil.

DETAILED DESCRIPTION

Embodiments relate to a block composite that includes an ethylene/alpha-olefin/diene interpolymer, a propylene based polymer, and a block copolymer/interpolymer (copolymer and interpolymer used interchangeably herein) for use in thermoplastic vulcanizates (TPV). Typically, in a TPV composition, a vulcanizable elastomer can be cross-linked (i.e., vulcanized) with a thermoplastic polyolefin in the presence of a curative system (e.g., cross-linking agent that is part of the curative system). In embodiments, components on the block composite can be cross-linked in the presence of a curative system, so as to simply a method of manufacturing thereof. Optionally, additional vulcanizable elastomer and/or theremoplastic polyolefin may be added to the TPV composition to adjust properties thereof, whereas the TPV composition includes greater than 15 wt % of the block composite.

With respect to the block copolymer of the block composite, two different phases are incorporated in the block copolymer. By two different phases it is meant that the block copolymer includes at least a first block and a second block having differing chemical or physical properties from the first block. As used herein, block copolymers comprise sequences ("blocks" and "segments") of monomer units, covalently bound to sequences of unlike type. The blocks copolymers may be multi-blocks that are connected in at least one of a variety of ways, such as A-B in a diblock form and A-B-A in a triblock form, etc., where A and B represent different blocks. Each of the blocks in the block copolymers may be described as one of a "hard" segment or a "soft" segment, e.g., as discussed in U.S. Pat. No. 8,569,422. A variety of block copolymer architectures are possible, e.g., examples include covalent bonding of hard plastic blocks (which may be substantially crystalline or glassy) to elastomeric blocks (such as thermoplastic elastomers).

The block copolymer is based on at least two different blocks, one of which is an ethylene/alpha-olefin/diene block and the other is a propylene based block. The ethylene/alpha-olefin/diene block may be an M-class rubber. M-class refers to a classification according to ASTM D1418 and the M-class distinction includes rubbers having a saturated chain of the polymethylene type. For example, the ethylene/alpha-olefin/diene block may include an ethylene-propylene-diene (M-class) rubber, also known as EPDM. The majority of the ethylene/alpha-olefin/diene rubbers that are manufactured, e.g., especially if it is low in crystallinity, can block and mass together and cannot stay in (free flow) pellet form, whereas pellet form is favorable for feeding into a continuous TPV production process. Accordingly, embodiments include a block composite having a block copolymer comprising an ethylene/alpha-olefin/diene block that combines an amorphous "soft" segment and contains crystalline and/or semi-crystalline "hard" segments, which enable easy pelletization during production and can be maintained in a (free flow) pellet form.

The TPV composition may include a block copolymer within the block composite that exhibits improved elastic recovery property and retains good tensile property.

Terms

"Composition" and like terms mean a mixture or blend of two or more components. For example, one composition is the combination of at least a thermoplastic polyolefin and a block interpolymer.

"Blend", "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Ethylene-based polymer" and the like terms mean a polymer that comprises a majority weight percent polymerized ethylene monomer (based on the total weight of polymerizable monomers), and optionally may comprise at least one polymerized comonomer different from ethylene (such as at least one selected from a $C_{3-10}$ α-olefin and a diene) so as to form an ethylene-based interpolymer. For example, when the ethylene-based polymer is a copolymer, the amount of ethylene is greater than 50 wt %, based on the total weight to the copolymer. When the ethylene-based polymer is an ethylene/comonomer/diene interpolymer, the amount of the ethylene is greater than the amount of the comonomer and the amount of the diene. "Units derived from ethylene" and like terms mean the units of a polymer that formed from the polymerization ethylene.

"Alpha-olefin-based polymer" and like terms mean a polymer that comprises a majority weight percent of a polymerized alpha-olefin monomer (based on the total amount of polymerizable monomers), and optionally comprises at least one other polymerized alpha-olefin comonomer that is different from the polymerized alpha-olefin monomer so as to form an alpha-olefin-based interpolymer. By alpha-olefin monomer and comonomer it is meant one of a $C_{3-10}$ α-olefin. "Units derived from α-olefin" and like terms mean the units of a polymer that is formed from the polymerization of α-olefin monomers, in particular at least one of a $C_{3-10}$ α-olefin. For example, the alpha-olefin based polymer may be a propylene based polymer, and optionally comprises at least one comonomer selected from a $C_2$ and $C_{4-10}$ α-olefin.

"Propylene-based polymer," and like terms mean a polymer that comprises a majority weight percent polymerized propylene monomer (based on the total amount of polymerizable monomers), and optionally comprises at least one polymerized comonomer different from propylene so as to form a propylene-based interpolymer. For example, when the propylene-based polymer is a copolymer, the amount of propylene is greater than 50 wt %, based on the total weight of the copolymer. "Units derived from propylene" and like terms mean the units of a polymer that formed from the polymerization of propylene monomers. "Units derived from α-olefin" and like terms mean the units of a polymer that formed from the polymerization of α-olefin monomers, in particular at least one of a $C_{3-10}$ α-olefin.

The term "block composite" (BC) refers to polymers comprising a soft interpolymer having a total comonomer content (such one of a $C_2$ and $C_{4-10}$ α-olefin and/or one of a diene) that is greater than 10 mol % and less than 95 mol %, a hard polymer having a monomer content (such as propylene), and a block copolymer (e.g., a diblock having a soft segment and a hard segment), wherein the hard segment of the block copolymer is essentially the same composition as the hard polymer in the block composite and the soft segment of the block copolymer is essentially the same composition as the soft copolymer of the block composite. The term "hard" segments/blocks refer to crystalline blocks of polymerized units. The term "soft" segments/blocks refer to amorphous, substantially amorphous, or elastomeric blocks of polymerized units.

"Hard" segments refer to highly crystalline blocks of polymerized units in which the monomer is present in an amount greater than 90 mol %, greater than 93 mol %, greater than 95 mol %, and/or greater than 98 mol %. In other words, the total comonomer content in the hard segments is less than 2 mol %, less than 5 mol %, less than 7 mol %, and/or less than 10 mol %. In some embodiments, the hard segments comprise all or substantially all propylene units. "Soft" segments, on the other hand, refer to amorphous, substantially amorphous or elastomeric blocks of polymerized units in which the total comonomer content (such one of a $C_2$ and $C_{4-10}$ α-olefin and/or one of a diene) is greater than 10 mol % and less than 90 mol % (e.g., greater than 20 mol % and less than 80 mol % and/or greater than 33 mol % and less than 75 mol %). Block copolymers containing high crystallinity hard blocks are polymers that have hard blocks that have melting points greater than 100° C. Applications for such block copolymers include TPV formulations, rubbers, and elastomer cross-linking agents.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline". The term "crystallizable" refers to a monomer that can polymerize such that the resulting polymer is crystalline. Crystalline propylene polymers may have, but are not limited to, densities of 0.88 g/cc to 0.91 g/cc and melting points of 100° C. to 170° C. The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads. For example, the hard block of the block copolymer may be isotactic polypropylene.

Block Composite

The block composite includes an ethylene/alpha-olefin/diene interpolymer, a propylene based polymer, and a block copolymer/interpolymer. The block copolymer includes a soft block that has the same composition as the ethylene/alpha-olefin/diene interpolymer and a hard block that has the same composition as the propylene based polymer. The block composite is a single composition that may exist as a pelletized blend for using in forming a TPV composition. Accordingly, in exemplary embodiments, a TPV composition may be formed by added the block composite as pellets and heating the pellets in the presence of a curative system. Optionally, a vulcanizable elastomer and/or thermoplastic polyolefin may be added to the TPV composition.

The block copolymer includes at least the soft block and the hard block having differing chemical and/or physical properties from the soft block. The soft block is derived from at least ethylene, a first alpha-olefin, and a first diene, and the hard block is derived from at least a propylene based polymer (e.g., a crystalline propylene based polymer that excludes diene). The terms "block interpolymer", "block copolymer", "pseudo-block copolymer", "pseudo-block interpolymer", "segmented copolymer", and "segmented interpolymer" refer to a block polymer comprising two or more chemically distinct regions (referred to as "blocks" or "segments") joined in a linear manner, that is, a polymer comprising chemically differentiated units which are joined (covalently bonded) end-to-end with respect to polymerized functionality, rather than in pendent or grafted fashion. The block copolymers may be linear multi-blocks (such as diblocks) or multi-block star copolymers (in which all blocks bond to the same atom or chemical moiety), whereas adjacent differentiated polymer units are joined end-to-end (e.g., covalently bonded in an end-to-end fashion). The blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymer may be differentiated from conventional, random copolymers, physical blends of polymers, and block copolymers prepared via sequential monomer addition.

The ethylene/alpha-olefin/diene interpolymer may be characterized as an M-class rubber. The alpha-olefin monomer may have from 3 to 10 carbon atoms (i.e., is a $C_3$ to $C_{10}$ olefin). The soft block of the block copolymer may be an ethylene/alpha-olefin/diene block, whereas the block may be characterized as an M-class rubber block. The ethylene/alpha-olefin/diene interpolymer and block may have an alpha-olefin content in an amount from 40 wt % to 80 wt %, based on the total weight of the interpolymer and block, respectively. The alpha-olefin content in the interpolymer and the soft block is the same. The ethylene/alpha-olefin/diene interpolymer and block may have a diene content in an amount from 0.1 wt % to 10.0 wt %, based on the total weight of the interpolymer and block, respectively. The alpha-olefin content in the interpolymer and the soft block is the same.

For example, the interpolymer and the soft block may have an alpha-olefin content in an amount from 40 wt % to 80 wt %, a diene content from 0.1 wt % to 10 wt %, and a remainder of ethylene, based on the total weight of the soft block. The ethylene/alpha-olefin/diene interpolymer may be considered an ethylene based polymer or an alpha-olefin based polymer, based on the amount of the ethylene relative to the alpha-olefin therein. Similarly, the ethylene/alpha-olefin/diene block may be consider an ethylene based polymer block or an alpha-olefin based polymer block, based on the amount of the ethylene relative to the alpha-olefin therein.

The alpha-olefin monomer for the interpolymer and the soft block may have from 3 to 10 carbon atoms (i.e., is a $C_3$ to $C_{10}$ olefin). Examples include propylene, isobutylene, 1-butene, 1-pentene, 1-hexane, 1-octene, 2-ethyl-1-hexene, and 1-dodecene. The $C_3$-$C_{10}$ olefins encompass aliphatic and aromatic compounds containing vinylic unsaturation, as well as cyclic compounds, such as cyclobutene, cyclopentene, dicyclopentadiene, and norbornene, including but not limited to, norbornene substituted with hydrocarbyl or cyclohydrocarbyl groups. The same alpha-olefin monomer is present in the interpolymer and the soft block.

The diene monomer for the interpolymer and the soft block may have from 2 to 25 carbon atoms (i.e., is a $C_2$ to $C_{25}$ diene), from 2 to 20 carbon atoms (i.e., is a $C_2$ to $C_{20}$ diene), 5 to 15 carbon atoms (i.e., is a $C_5$ to $C_{15}$ diene), and/or 8 to 12 carbon atoms (i.e., is a $C_8$ to $C_{12}$ diene). Exemplary dienes include isoprene, butadiene, chloroprene ethylidene norbornene, dicyclopentadiene, 1,4-hexadiene, 1,4-pentadiene, 1,5-hexadiene, 2,5-dimethyl-1,5-hexadiene, 1,4-octadiene, cyclopentadiene, cyclohexadiene, cyclooctadiene, dicyclopentadiene, 1-vinyl-1-cyclopentene, 1-vinyl-1-cyclohexene, 3-methyl-bicyclo (4,2,1) nona-3,7-diene, 3-ethylbicyclonondiene, methyl tetrahydroindene, 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and 3-methyl-tricyclo-(5,2,1,0.sup.2,6)-3,8-decadiene. An exemplary, ethylene/polyolefin/diene is an ethylene-propylene-diene (M-class) rubber, also known as EPDM. The dienes used to prepare EPDMs, include 1,4-hexadiene (HD), 5-ethylidene-2-norbornene (ENB), 5-vinylidene-2-norbornene (VNB), 5-methylene-2-norbornene (MNB), and dicyclopentadiene (DCPD). The same diene monomer is present in the interpolymer and the soft block.

The hard block of the block copolymer has the same composition as the propylene based polymer. The propylene based polymer and the hard block each includes at least 50 wt % (e.g., at least 60 wt %, at least 70 wt %, at least 80 wt %, at least 90 wt %, and/or at least 95 wt %) of polypropylene. In exemplary embodiments, the propylene content is from 90 wt % to 100 wt % and/or 95 wt % to 100 wt %. The propylene based polymer may be a homopolymer or an interpolymer. The hard block may be a polypropylene homopolymer block or a polypropylene interpolymer block. By interpolymer, it is meant that the polymer (and block) includes at least 50 wt % (e.g., at least 60 wt %, at least 70 wt %, at least 80 wt %, at least 90 wt %, and/or at least 95 wt %) of polypropylene and a remainder of an alpha-olefin monomer that is at least one selected from the group of a $C_2$ and $C_4$ to $C_{10}$ olefin, so as a total of the propylene and the at least one alpha-olefin monomer is 100 wt %. For example, the polymer may be a propylene-ethylene copolymer, a propylene-butylene, and/or a propylene-octene copolymer. For example, the propylene based polymer may be a crystalline homopolymer or interpolymer and the hard block may be a crystalline homopolymer or interpolymer block. For example, the propylene based polymer may be a polypropylene homopolymer such as isotactic polypropylene (iPP) and the hard block may be a polypropylene homopolymer such as isotactic polypropylene block.

The soft block may be present in the block interpolymer from approximately 1 wt % to 99 wt % of the total weight of the block interpolymer. For example, the soft segments may be present in an amount from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, and/or from 45 wt % to 55 wt % of the total weight of the block interpolymer. The hard segments may be present in similar ranges, e.g., so as to account for a remainder with respect to the total segments in the block interpolymer. In the block interpolymers, all blocks are characterized as one of a hard segment or a soft segment, based on the total ethylene and/or alpha-olefin content in the block. The polymer is said to have a hard segment majority when the amount of hard segments present is greater than the amount of the soft segments present. The soft segment weight percentage and the hard segment weight percentage can be calculated based on data obtained from DSC or NMR. Such methods and calculations are disclosed in, e.g., U.S. Pat. No. 8,486,878.

The block copolymers/interpolymers include alternating blocks containing differing quantities of the diene (including none) and/or α-olefin. For example, the amount of propylene may be greater in the hard block than the soft block and the diene may only be incorporated into the soft block and not the hard block. By use of the block copolymer, the total quantity of diene and alpha-olefin may be reduced without loss of subsequent polymer properties. That is, the some of diene and alpha-olefin monomers are incorporated into a block of the copolymer rather than uniformly or randomly throughout a polymer, they are more efficiently utilized and subsequently the crosslink density of the block interpolymer may be better controlled. Such crosslinkable elastomers and the cured products have advantaged properties, e.g., relatively higher tensile strength and better elastic recovery.

Comonomer content may be measured using any suitable technique, including techniques based on nuclear magnetic resonance ("NMR") spectroscopy. For polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

The block copolymers may be characterized by unique distributions of polymer polydispersity (PDI or Mw/Mn) and block length distribution (e.g., with two or three different block compositions). The block copolymers may comprise alternating blocks of differing comonomer content (including homopolymer blocks). The block copolymers may contain terminal blocks. For example, based on the effect of the use of one or more shuttling agents in combination with a high activity metal complex based polymerization catalyst in two or more polymerization reactors or zones operating under differing polymerization conditions. The block copolymers may possess a PDI from 1.7 to 3.5 (e.g., from 1.8 to 2.5, from 1.8 to 2.2, and/or from 1.8 to 2.1). The block copolymers may block lengths are a most probable distribution, rather than identical or nearly identical block lengths. The pseudo-block copolymers/block interpolymers may possess a PDI fitting a Schultz-Flory distribution rather than a Poisson distribution, whereas a distribution in block size of polymer blocks of differing density or comonomer content is a Schultz-Flory type of distribution.

The block composite may have a Block Composite Index (BCI), as defined below, that is greater than zero and less than 0.500. For example, the BCI may be from 0.020 to 0.400, from 0.050 to 0.300, from 0.050 to 0.200, and/or from 0.050 to 0.100.

For example, the block composites may possess (1) a PDI of at least 1.3, at least 1.5, at least 1.7, at least 2.0, and/or at least 2.4, up to a maximum value of 5.0, 3.5, and/or 2.7; (2) a heat of fusion of 80 J/g or less; (3) an overall ethylene content of at least 50 wt % and/or 60 wt % (e.g., and less than 85 wt %); (4) an overall diene content of less than 10 wt %, less than 5 wt %, and/or less than 1 wt %; (5) a glass transition temperature, Tg, of less than −25° C. and/or less than −30° C.; and/or (6) one and only one Tm (e.g., see FIG. 1).

The block composites may have a melt flow rate (MFR) from 0.01 to 2000 g/10 minutes, from 0.01 to 1000 g/10 minutes, from 0.01 to 500 g/10 minutes, and/or from 0.01 to 100 g/10 minutes. In certain embodiments, the block composite may have a MFR from 0.1 to 50 g/10 minutes, from 1 to 30 g/10 minutes, from 5 to 25 g/10 minutes, from 10 to 25 g/10 minutes, and/or 15 to 20 g/10 minutes. The density of the block composite may be from 0.80 to 0.99 g/cm$^3$ and/or from 0.85 g/cm$^3$ to 0.97 g/cm$^3$. For example, the density of the block composite may range from 0.860 to 0.925 g/cm$^3$ or 0.867 to 0.910 g/cm$^3$.

Processes useful for making the block composite and the block copolymer are a part thereof are those as described in, e.g., International Publication No. WO 2007/035485. For example, the polymers may be made by a process comprising contacting an addition polymerizable monomer or mixture of monomers under addition polymerization conditions with a composition comprising at least one addition polymerization catalyst, cocatalyst, and chain shuttling agent. The process is characterized by formation of at least some of the growing polymer chains under differentiated process conditions in two or more reactors operating under steady state polymerization conditions or in two or more zones of a reactor operating under plug flow polymerization conditions. Chain terminating agents such as hydrogen may be used if desired to control reactor viscosity or polymer molecular weight.

The block composite and the copolymer described herein is prepared using a method that is distinguishable from anionic polymerization and controlled free radical polymerization. In particular, such methods require sequential monomer addition with polymerization to relative completeness and the types of monomers that can be usefully employed in such methods are limited. For example, in the anionic polymerization of styrene and butadiene to form a SBS type block copolymer, each polymer chain requires a stoichiometric amount of initiator and the resulting polymers have extremely narrow molecular weight distribution, Mw/Mn, preferably from 1.0 to 1.3. That is, the polymer block lengths are substantially identical. Additionally, anionic and free-radical processes are relatively slow, resulting in poor process economics, and not readily adapted to polymerization of α-olefins. In particular, the block copolymer described herein is produced efficiency and catalytically (that is, in a process where more than one polymer molecule is produced for each catalyst or initiator molecule). In certain of these polymers, it is highly desirable that some or all of the polymer blocks comprise amorphous polymers such as a copolymer of ethylene and a comonomer, especially amorphous random copolymers comprising ethylene and an α-olefin (monomer) having 3 or more carbon atoms. Finally, it would be desirable to prepare pseudo-block or block copolymers wherein a substantial fraction of the polymer molecules are of a controlled block number, especially diblocks or triblocks, but wherein the block lengths are a most probable distribution, rather than identical or nearly identical block lengths Representative catalysts and chain shuttling agent for forming the block copolymer are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of International Publication Nos. WO 2003/040195 and WO 2004/024740.

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of International Publication Nos. WO 2003/040195 and WO 2004/024740.

Catalyst (A3) is bis[N,N'''-(2,4,6-tri(methylphenyl)amido)ethylenediamine]hafnium dibenzyl.

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of U.S. Publication No. 2004/0010103.

Catalyst (A5) is (bis-(1-methylethyl)(2-oxoyl-3,5-di(t-butyl)phenyl)immino)zirconium dibenzyl.

X = CH₂C₆H₅

The preparation of catalyst (A5) is conducted as follows.

a) Preparation of (1-methylethyl)(2-hydroxy-3,5-di(t-butyl)phenyl)imine

3,5-di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of (bis-(1-methylethyl)(2-oxoyl-3,5-di(t-butyl)phenyl)immino) zirconium dibenzyl A solution of (1-methylethyl)(2-hydroxy-3,5-di(t-butyl)phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

Catalyst (A6) is bis-(1-(2-methylcyclohexyl)ethyl)(2-oxoyl-3,5-di(t-butyl)phenyl)immino) zirconium dibenzyl

X = CH$_2$C$_6$H$_5$

The preparation of catalyst (A6) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl)(2-oxoyl-3,5-di(t-butyl)phenyl) immino) zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Catalyst (A7) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

Catalyst (A8) is (t-butylamido)di(4-methylphenyl)(2-methyl-1,2,3,3a,7a-η-inden-1-yl)silanetitanium dimethyl prepared substantially according to the teachings of U.S. Patent Publication No. 2003/004286:

Catalyst (A9) is (t-butylamido)di(4-methylphenyl)(2-methyl-1,2,3,3a,8a-η-s-indacen-1-yl)silanetitanium dimethyl prepared substantially according to the teachings of U.S. Patent Publication No. 2003/004286:

Catalyst (A10) is bis(dimethyldisiloxane)(indene-1-yl) zirconium dichloride available from Sigma-Aldrich:

Exemplary shuttling agents that may be employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di (trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Thermoplastic Vulcanizate Composition

The thermoplastic vulcanizate (TPV) composition includes at least one the block composite and a curative system. The block composite includes therein an entirety or a part of the overall thermoplastic polymer that establishes the basis of a polymer matrix phase for the overall TPV composition. The block composite further includes there an entirety or a part of the overall vulcanizable elastomer (rubber) that establishes a rubber phase for the overall TPV composition. Optional, the TPV composition may include additional thermoplastic polymer and/or vulcanizable elastomer. In exemplary embodiments, the in an effort to simplify a method of manufacturing thereof, the TPV composition excludes any of the additional thermoplastic polymer and vulcanizable elastomer or includes only one of the thermoplastic polymer or vulcanizable elastomer.

The TPV composition include includes greater than 15 wt % of the block composite, e.g., the TPV composition may include greater than 15 wt % and to up to 70 wt % of the block composite. For example, the amount of the TPV composition may be from 16 wt % to 70 wt %, 20 wt % to 70 wt %, 25 wt % to 70 wt %, 25 wt % to 60 wt %, 25 wt % to 55 wt %, 30 wt % to 55 wt %, 35 wt % to 55 wt %, and/or 45 wt % to 55 wt %. In exemplary embodiments, the amount of the block composite is greater than 40 wt %. Of the block composite, the block copolymer may account for at least 5 wt % of the overall weight of the block composite. For example, the amount of the block copolymer may be from 5 wt % to 50 wt %, from 5 wt % to 40 wt %, from 5 wt % to 30 wt %, from 5 wt % to 20 wt %, and/or from 5 wt % to 15 wt %, based on the total weight of the block composite.

Of the block composite, the ethylene/alpha-olefin/diene interpolymer may account for at least 15 wt % of the overall weight of the block composite. For example, the amount of the ethylene/alpha-olefin/diene interpolymer may be from 15 wt % to 70 wt %, from 20 wt % to 60 wt %, from 30 wt % to 60 wt %, from 35 wt % to 55 wt %, and/or from 40 wt % to 55 wt %, based on the total weight of the block composite. Of the block composite, the propylene based polymer may account for at least 15 wt % of the overall weight of the block composite. For example, the amount of the propylene based polymer may be from 15 wt % to 70 wt %, from 20 wt % to 60 wt %, from 30 wt % to 60 wt %, from 35 wt % to 55 wt %, and/or from 40 wt % to 55 wt %, based on the total weight of the block composite.

The TPV composition includes a curative system. The curative system may account for up to 10 wt % of the total weight of the TPV composition. For example, the curative system may be present in an amount from 0.1 wt % to 10.0 wt %, 0.1 wt % to 9.0 wt %, 1.0 wt % to 8.0 wt %, 1.0 wt % to 5.0 wt %, and/or 1.0 wt % to 2.5 wt %. The curative system may include at least one catalyst and/or at least one cross-linking agent, such as any cross-linking agent that is capable of curing an elastomer and/or that assists in the curing process of the elastomer. Exemplary catalysts include tin based catalysts, amine based catalysts, and zinc based catalysts. For example, the cross-linking agent may be capable of curing an elastomer without substantially degrading and/or curing the thermoplastic polymer used in the TPV composition. For example the cross-linking agent may be selective toward curing at least one of the blocks in the block interpolymer. Exemplary cross-linking agents include peroxides, phenolic resins, azides, aldehyde-amine reaction products, vinyl silane grafted moieties, hydrosilylation, substituted ureas, substituted guanidines; substituted xanthates; substituted dithiocarbamates; sulfur-containing compounds, (such as thiazoles, imidazoles, sulfenamides, thiuramidisulfides, paraquinonedioxime, dibenzoparaquinonedioxime, and sulfur); and combinations thereof.

The TPV composition may be oil extended, e.g., may include at least one oil blended therein. For example, the oil (i.e., total oil) may account for 1 wt % to 70 wt % (e.g., 20 wt % to 70 wt %, 20 wt % to 60 wt %, 20 wt % to 50 wt %, and/or 25 wt % to 45 wt %) of the total weight of the TPV composition. For example, the amount of the oil may be from 25 wt % to 40 wt % and/or 25 wt % to 35 wt %, based on the total weight of the TPV composition. Exemplary oils include any oil that is conventionally used in manufacturing extended EPDM rubber formulations. Examples include both naphthenic- and paraffinic-oils. For example, the oil may be a white mineral oil.

The TPV composition may include additional amounts of at least one vulcanizable elastomer that is separate (e.g., separately added) from the block composite. If included, the TPV composition may include from 1 wt % to 50 wt % (e.g., 5 wt % to 40 wt %, 5 wt % to 30 wt %, 10 wt % to 25 wt %, and/or 15 wt % to 25 wt %) of the vulcanizable elastomer. For example, the amount of the vulcanizable elastomer may be from 17 wt % to 25 wt %. Exemplary elastomers include natural rubber, ethylene/propylene (EPM) copolymers, ethylene/propylene/diene (EPDM) copolymers, styrene/butadiene copolymers, chlorinated polyethylene, and silicone rubber. An exemplary vulcanizable elastomer includes an ethylene-propylene-diene (EPDM) copolymer that has not undergone the process with respect to forming a block interpolymer. Exemplary EPDM copolymers include those available under the tradename NORDEL™ from The Dow Chemical Company.

The TPV composition may include an optional thermoplastic polymer that is separate (e.g., separately added) from the block composite. If included, the TPV composition may include from 1 wt % to 50 wt % (e.g., 5 wt % to 40 wt %, 5 wt % to 30 wt %, 10 wt % to 25 wt %, and/or 15 wt % to 25 wt %) of at least one thermoplastic polymer. Exemplary optional thermoplastic polymers include polyethylene (including branched polyethylene and polyethylene based polymers), polypropylene (including branched polypropylene and polypropylene based polymers), polycarbonate, block composites including olefin block copolymers/interpolymers (different from the block interpolymer that includes an ethylene/alpha-olefin/diene block discussed above), polystyrene, polyethylene terephthalate (including branched polyethylene terephthalate), and nylon (including branched nylon). For example, the TPV composition may include an optional thermoplastic polyolefin that is derived from an alpha-olefin monomer that has from 2 to 20 carbon atoms (i.e., a $C_2$ to $C_{20}$ olefin), from 2 to 10 carbon atoms (i.e., a $C_2$ to $C_{10}$ olefin), and/or from 2 to 5 carbon atoms (i.e., a $C_2$ to $C_5$ olefin). For example, the thermoplastic polyolefin may include ethylene, propylene and/or butylene monomers. The thermoplastic polyolefin may be based on polypropylene, polyethylene, or polybutylene. The theremoplastic polyolefin may be a polypropylene homopolymer such as isotactic polypropylene (iPP). In embodiments the thermoplastic polyolefin may be crystalline and have a high melting point above 100° C.

The properties of a TPV may be modified, either before or after vulcanization, e.g., by addition of ingredients that are used in the compounding of EPDM rubber, thermoplastic polymer resin, and/or blends thereof. Exemplary modifiers include particulate filler such as organic or inorganic particles (including organic or inorganic fibers, nano-sized particles, and carbon black), zeolites, amorphous precipitated or fumed silica, titanium dioxide, colored pigments, clay, talc, calcium carbonate, wollastonite, mica, montmorillonite, glass beads, hollow glass spheres, glass fibers, zinc oxide and stearic acid, stabilizers, antidegradants, flame retardants, processing aids, adhesives, tackifiers, oil extenders (including paraffinic or napthelenic oils), and other natural and synthetic polymers, plasticizers, wax, discontinuous fibers (such as wood cellulose fibers), and extender oils. Similarly, the block interpolymers may be combined with additives and adjuvants. Suitable additives include, but are not limited to, fillers, tackifiers, oil extenders (including paraffinic or napthelenic oils), and other natural and synthetic polymers. Additionally, minor amounts of a different polymer may be used as a carrier for any of the additives. An example of such a polymer would be polyethylene, for example AFFINITY® resins (The Dow Chemical Company) and EXACT® resins (ExxonMobil Chemical Company.

The TPV may be used to prepare various useful articles with known polymer processes such as extrusion (e.g., sheet extrusion and profile extrusion), injection molding, molding, rotational molding, and blow molding. Typically, extrusion is a process by which a polymer is propelled continuously along a screw through regions of high temperature and pressure where it is melted and compacted, and finally forced through a die. The extruder can be a single screw extruder, a multiple screw extruder, a disk extruder, or a ram extruder. The die can be a film die, blown film die, sheet die, pipe die, tubing die, or profile extrusion die. Injection molding is widely used for manufacturing a variety of plastic parts for various applications. Typically, injection molding is a process by which a polymer is melted and injected at high pressure into a mold, which is the inverse of the desired shape, to form parts of the desired shape and size.

Molding is typically a process by which a polymer is melted and led into a mold, which is the inverse of the desired shape, to form parts of the desired shape and size. Molding can be pressure-less or pressure-assisted. Rotational molding is a process typically used for producing hollow plastic products. Rotational molding may differ from other processing methods in that the heating, melting, shaping, and cooling stages all occur after the polymer is placed in the mold, therefore no external pressure is applied during forming. Blow molding may be used for making hollow plastics containers. The process typically includes placing a softened polymer in the center of a mold, inflating the polymer against the mold walls with a blow pin, and solidifying the product by cooling. There are three general types of blow molding: extrusion blow molding, injection blow molding, and stretch blow molding.

TPV compositions may be useful for making a variety of articles such as tires, hoses, belts, gaskets, moldings, shoe soles, and molded parts. The molded part may be prepared by injection molding, extrusion blow molding, or injection blow molding. The molded part may be foamed by a chemical or physical blowing agent. The TPV composition may be useful for applications that seek high melt strength such as large part blow molding, foams, and wire cables.

Preparation of Thermoplastic Vulcanizates

Thermoplastic vulcanizates may be prepared by blending plastic and cured rubbers by dynamic vulcanization. A variety of mixing equipment may be employed to prepare a TPV by dynamic vulcanization processes. Illustrative mixing equipment include: batch mixers, such as BRABENDER® mixers, Banbury brand mixers, continuous mixers such as FARREL continuous mixers, and extruders with one or more screws such as COPERION ZSK 53. One or more such mixing equipment, including extruders, may be used in series.

At least the block composite and curatives (and the optional thermoplastic polymer and/or vulcanizable elastomer if included) may be added to a heated mixer as individual feed streams, as a dry blend, or as a masterbatch. When an extruder is used to prepare the TPV composition, if additional oil is needed, the oil is may be added from a port provided in the melt mixing device using a gear pump or the like. Additional additives or materials, including other resins and elastomers, may be added by a side feeder on the melt mixing device, or the like.

Exemplary curing temperatures for the TPV are well-known to one skilled in the art. Exemplary curing temperatures may depend on the thermoplastic polymer and vulcanizing agent and/or activator. The curing temperatures may the range from 80° C. to 300° C. For example, when a polypropylene homopolymer is used as the thermoplastic polymer and the curative is a phenolic resin, a curing temperature of 170° C. to 270° C. and/or 190° C. to 250° C. may be used. Heating and masticating at these vulcanization temperatures may be adequate to complete the vulcanization reaction in a few minutes or less, but if shorter vulcanization times are desired, higher temperatures may be used. The desired dispersion of discrete crosslinked rubber particles (in this case rubber block interpolymers) and end properties may be achieved through choice of screw design and screw speed. The progress of the vulcanization may be followed by monitoring melt temperature or mixing energy or mixing torque requirement during the process. If desired, one can add additional ingredients, such as a stabilizer package, processing aid, oil, plasticizer, and/or additional thermoplastic polymer after the dynamic vulcanization is complete.

In some embodiments, the TPV is made using a one step or two or more step compounding process. For example, in one-step compounding using phenolic curatives, the compounding temperature may be maintained below 220° C., e.g., to avoid breaking down the phenolic curative agent. In two-step compounding, when the vulcanizing agent does not require a cure activator, the TPV premix will not contain any vulcanizing agent. If the vulcanizing agent requires a cure activator, the cure activator can be added to the TPV premix and the curative agent may be added during the second step and the temperature during the second step may be maintained below 220° C.

After discharge from the mixing device, the TPV may be milled, chopped, extruded, pelletized, injection molded, or processed by any other desirable technique.

With respect to TPV compositions it would be desirable for many applications to have improved tensile strength, compression set, and/or the total toughness. It is believed that such properties may be improved by a reduction of the rubber particle size and/or an increase of interfacial adhesion between the rubber phase and the plastic phase. Thermoplastic vulcanizates from polypropylene and EPDM can be modified by random polypropylene copolymer or random ethylene-/alpha-olefin copolymers polymerized by single site catalyst including metallocene catalyst for an improvement in the physical properties of the TPV. However, those compatibilizers generally improve the ultimate elongation and toughness, but not the compression set. Accordingly, embodiments relate to the use of a block composite, in which resultant TPV composition may provide an improvement in at least compression set may be realized while still having good and/or improved tensile strength and/or total toughness.

Unless stated to the contrary, implicit from the context, or customary in the art, all parts and percents are based on weight and all test methods are current as of the filing date of this disclosure. All molecular weight numbers are based on number average molecular weight, unless indicated otherwise. The numerical ranges in this disclosure are approximate.

EXAMPLES

Characterization Methods

Exemplary characterization (test) methods with respect to block composites, block copolymers, and the preparation methods thereof are discussed in U.S. Pat. Nos. 8,569,422, 8,476,366, and/or 8,716,400. Exemplary characterization methods with respect thermoplastic vulcanizates and the preparation methods thereof are discussed in U.S. Pat. No. 8,476,366.

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −90° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)). Unless otherwise stated, melting point(s) ($T_m$) of each polymer is determined the heat curve (peak Tm). The enthalpy is calculated with respect to a linear baseline drawn from the beginning to the end of the melting peak; typical beginning temperatures for polyolefin rubber is −35° C.

High Temperature Liquid Chromatography (HTLC) is performed according to the methods disclosed in, e.g., U.S. Patent Publication No. 2010/0093964. Samples were analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IRS detector was provided by PolymerChar, Valencia, Spain.

Columns:

The D1 column was a high temperature Hypercarb graphite column (2.1×100 mm) purchased from Thermo Scientific. The D2 column was a PLRapid-H column purchased from Varian (10×100 mm).

Reagents:

HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation:

0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

Ht-2DLC:

The D1 flow rate was at 0.01 ml/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; //Maintain the constant flow rate of 0.01 mL/min from 0-490 min.
2. 491 min: flow=0.20 min; //Increase the flow rate to 0.20 mL/min.
3. 492 min: % B=100; //Increase the mobile phase composition to 100% TCB
4. 502 min: % B=100; //Wash the column using 2 mL of TCB Equilibrium Step:
5. 503 min: % B=0; //Change the mobile phase composition to 100% of 1-decanol or decane
6. 513 min: % B=0; //Equilibrate the column using 2 mL of weak eluent 7. 514 min: flow=0.2 ml/min; //Maintain the constant flow of 0.2 mL/min from 491-514 min
8. 515 min: flow=0.01 mL/min; //Lower the flow rate to 0.01 mL/min.

After step 8, the flow rate and mobile phase composition were the same as the initial conditions of the run gradient. The D2 flow rate was at 2.51 ml/min. Two 60 µL loops were installed on the 10-port switch valve. 30-µL of the eluent from D1 column was loaded onto the SEC column with every switch of the valve. The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard. The weight % of isolated PP is measured as the area that corresponds to the hard block composition based on the isolated peak and the retention volume as determined by a composition calibration curve.

$^{13}$C NMR Analysis for determining the characteristics of the block interpolymer is performed by preparing samples by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data is collected using a JEOL Eclipse™ 400 MHz spectrometer or a Varian Unity Plus™ 400 MHz spectrometer, corresponding to a $^{13}$C resonance frequency of 100.5 MHz. The data is acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Gel Permeation Chromatography (GPC) is a system that consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polypropylene}=0.645(M_{polystyrene})$. Polypropylene equivalent molecular weight calculations are performed using Viscotek TriSEC software Version 3.0.

Melt Index and Melt Flow Rate:

Melt Index ($I_2$) is measured in grams per 10 minutes, is done in accordance with ASTM D 1238, condition 190° C./2.16 kg. The MFR of the PP resins is measured in accordance to ASTM D 1238, condition 230° C./2.16 kg.

Shore A Hardness is determined using ASTM D2240. In particular, measurements are taken with a Shore A type durometer. The durometer is placed onto a plaque of approximately 3 mm thickness.

Tensile Properties are determined using ASTM D1708. In particular, 100% modulus (MPa), tensile strength at break (%), and elongation at break (%) are measured according to ASTM D1708.

Compression Set is determined using ASTM D395 at (1) 25% strain based on 22 hours at 70° C., and (2) 25% strain based on 70 hours at 120° C. Compression set is a measure of the degree of recovery of a sample following compression and is calculated according to the equation CS=(H0−H2)/(H0−H1), where H0 is the original thickness of the sample, H1 is the thickness of the spacer bar used, and H2 is the final thickness of the sample after removal of the compressive force.

Tear Strength is determined using ASTM D624.

Density is determined using ASTM D792.

Preparation of Block Composite

The Block Composite is produced using a catalyst fed simultaneously into both reactors. The soft block is produced in the first reactor and the low crystallinity hard block is produced in the second reactor. The split between soft and hard block is 50:50. Fresh ENB was slowly added in 0.1 lb/hr increments into the solvent stream being fed into the second reactor until a level of 0.9 wt % was incorporated into the polymer. The ENB is incorporated into the amorphous, soft block.

The Block Composite is prepared using two continuous stirred tank reactors (CSTR) connected in series. Each reactor is hydraulically full and set to operate at steady state conditions. Sample A1 is prepared by flowing monomers, Catalyst, Cocatalyst-1, Cocatalyst-2, and SA according to the process conditions outlined in Table 1. Two port injectors are used to feed the Catalyst, Cocatalyst-1, Cocatalyst-2, and SA (shuttling agent)-1, separately into the reactors. For preparation of the Block Composite, the Catalyst is ([[rel-2',2'''-[(1R,2R)-1,2-cylcohexanediylbis(methyleneoxy-κO)]

bis[3-(9H-carbazol-9-yl)-5-methyl[1,1'-biphenyl]-2-olato-κO]](2-)]dimethyl-hafnium). The Cocatalyst-1 is a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.) are used. The Cocatalyst-2 is mixed $C_{14-18}$ alkyldimethylammonium salt of bis(tris(pentafluorophenyl)-alumane)-2-undecylimidazolide, prepared according to U.S. Pat. No. 6,395,671, Ex. 16. The SA-1 is a solution of diethylzinc (DEZ) that may contain 1-3 mol % of modified methylalumoxane (MMAO-3A) from Akzo Nobel Chemicals. Upon exiting the reactor, water and/or additives may be injected into the polymer solution.

The process conditions for producing the Block Composite are as follows:

TABLE 1

| Condition | 1st Reactor | 2nd reactor |
|---|---|---|
| Reactor Control Temp. (° C.) | 94.94 | 100.09 |
| Solvent Feed (lb/hr) | 228.97 | 343.04 |
| Ethylene Feed (lb/hr) | 9.74 | — |
| Propylene Feed (lb/hr) | 10.47 | 29.78 |
| ENB Feed (lb/hr) | 0.53 | — |

TABLE 1-continued

| Condition | 1st Reactor | 2nd reactor |
|---|---|---|
| Reactor Propylene Conc. (g/L) | 1.52 | 14.88 |
| Hydrogen Feed (sccm)[1] | 9.70 | 9.73 |
| Catalyst Flow (lb/hr) | 1.67 | 2.70 |
| Catalyst Conc. (ppm) | 600 | 600 |
| Cocatalyst-1 Flow (lb/hr) | 1.01 | 1.74 |
| Cocatalyst-1 Conc. (ppm) | 8000 | 8000 |
| Cocatalyst-2 Flow (lb/hr) | 0.37 | — |
| Cocatalyst-2 Conc. (ppm) | 1992 | — |
| SA1 Flow (lb/hr)[2] | 0.59 | — |
| SA1 Concentration (ppm) | 30000 | — |

[1]Standard cm³/min.
[2]The SA1 includes DEZ and 1-3 mol % of MMAO.

Figure 1:
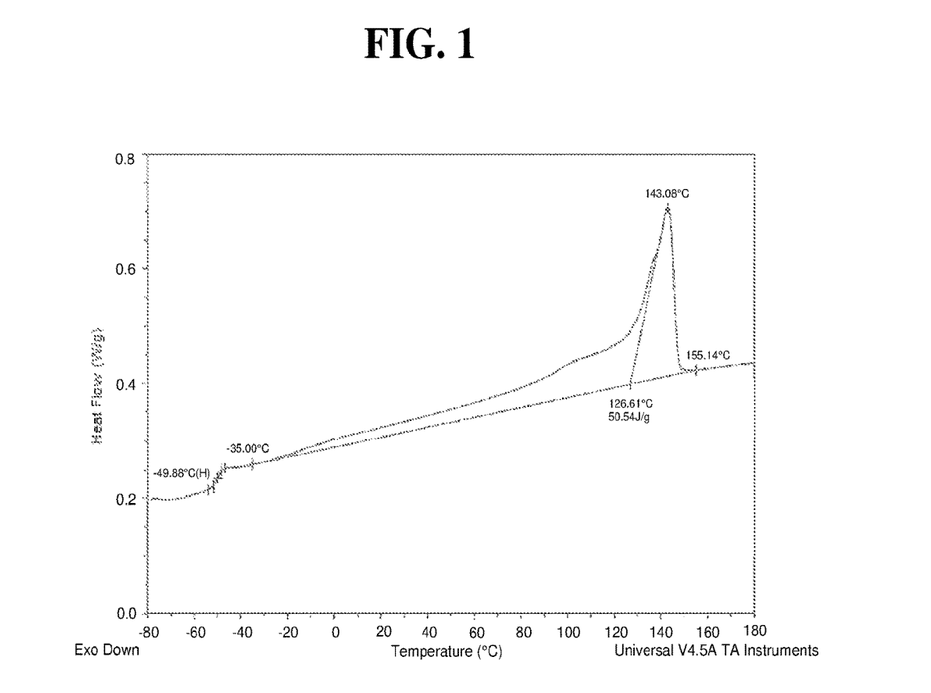
FIG. 1 illustrates a set of two DSC melting point temperature profiles of the block composite in Working Examples 1 to 4. The first DSC profile is that of the second heating and the second DSC profile is that of the first cooling. In particular, with respect to the block composite, using DSC for analysis, a first heating, a first cooling, and a second heating are subsequently conducted.
Figure 2:
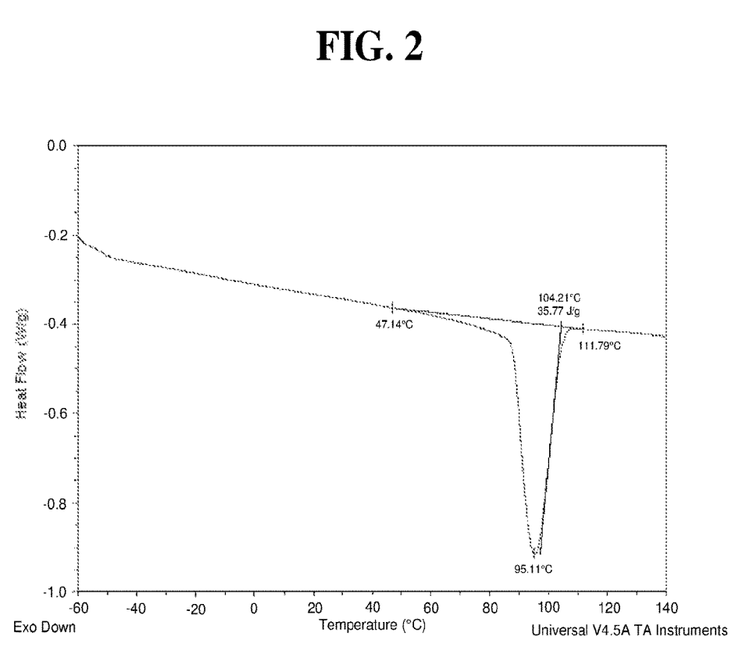
FIG. 2 illustrates DSC cooling profiles of the block composite in Working Examples 1 to 4, including a peak Tc of 95.11° C., an onset Tc of 104.21° C., and an overall crystalline enthalpy of 35.77 J/g.

The DSC melting point temperature profile (second heating and first cooling) of the resultant block composite is shown in FIG. 1. The density of the Block Composite is 0.877 g/cm³.

The Block Composite includes an iPP-EPDM block copolymer, an EPDM polymer, and an iPP (isotactic polypropylene) polymer. The block composite index is 0.088, as discussed below. The ratio of the EPDM polymer to the iPP polymer is set for approximately 1:1.

Characteristics of the Block Composite is shown in Table 2, below

TABLE 2

| | MFR (g/10 min at 230° C. and 2.1 kg) | Mw (kg/mol) | Mw/Mn | Total $C_2$ (wt %) | Total ENB (wt %) | Tm (° C.) | Tc (° C.) | Tg (° C.)[1] | Melt Enthalpy (J/g) |
|---|---|---|---|---|---|---|---|---|---|
| Block Composite | 18 | 149 | 3.0 | 19.8 | 0.9 | 143 | 95 | −50 | 50.5 |

The composition of the Block Composite is shown in Table 3, below. In particular, the total wt % $C_2$ incorporated to the block copolymer from the 1st Reactor and the total wt % $C_2$ incorporated to the block copolymer from the 2st Reactor, based on the total weight of the sample of the block composite, are shown in Table 3. Whereas, an overall total $C_2$ content of the block copolymer is shown in Table 2, above. Further, wt % of ENB in the block copolymer from the 1st Reactor and wt % ENB in the block copolymer from the 2st Reactor, based on the total weight of the block composite, are shown in Table 3. Further, the percentage of the total weight of the block copolymer made in the 1st reactor and the total weight of the block copolymer made in the 2nd reactor (with a total of 100 wt %), are shown in Table 3.

TABLE 3

| | wt % $C_2$ in block copolymer from 1st Reactor | wt % $C_2$ in block copolymer from 2nd Reactor | wt % ENB in block copolymer from 1st Reactor | wt % ENB in block copolymer from 2nd Reactor | wt % of block copolymer made in 1st Reactor | wt % of block copolymer made in 2nd Reactor |
|---|---|---|---|---|---|---|
| Block Composite | 40.8 | 0.25 | 1.5 | 0.0 | 50 | 50 |

Further, characterization of the Block Composite involves determination of an estimated Block Composite Index (BCI), which is summarized in Table 4, below.

TABLE 4

| Example | Weight fraction EPDM Soft | Weight fraction iPP Hard | Block Composite Index |
|---|---|---|---|
| Whole Polymer | 0.482 | 0.518 | 0.088 |

For the determination of the BCI, the first stage is the preparation of fractioned samples, the results of which are summarized in Table 5, below. The process of preparing fractioned samples involves the following:

Two to four grams of polymer is dissolved in 200 ml o-xylene under reflux conditions for 2 hours. The solution is then cooled in a temperature controlled water bath to 25° C. to allow the crystallization of the xylene insoluble fraction. Once the solution is cooled and the insoluble fraction precipitates from the solution, the separation of the xylene soluble fraction from the xylene insoluble fraction is done by filtration through a filter paper. The remaining o-xylene solvent is evaporated from the filtrate. Both xylene soluble (XS) and xylene insoluble (XI) fractions are dried in a vacuum oven at 100° C. for 60 min and then weighed.

In particular, the Whole Polymer is subjected to the extraction procedure to produce the xylene Insoluble Fraction and the xylene Soluble Fraction. Table 5 shows the analytical results for runs. The molecular weight distributions of the polymers are relatively narrow, ranging from 2.3 to 3.0. An EPDM block connected to an iPP block may enhance the chains' solubility in the solvent and/or interfere with the crystallization of the iPP block.

The results are summarized below:

TABLE 5

| Fraction | wt % polymer from xylene Extraction | Mw Kg/mol | Mw/Mn | wt % $C_2$ | wt % ENB | Tm (° C.) | Tc (° C.) | Tg (° C.) | Melt Enthalpy (J/g) |
|---|---|---|---|---|---|---|---|---|---|
| Whole Polymer | — | 149 | 3.0 | 19.8 | 0.9 | 143 | 95 | −50.0 | 50.5 |
| Insoluable fraction | 52.9 | 205 | 2.5 | 3.5 | 0.3 | 144 | 99 | −8.5 | 52.2 |
| Soluable fraction | 47.1 | 90.5 | 2.3 | 41.6 | 1.5 | 93 | 24 | −48.0 | 3.4 |

In this analysis, the xylene soluble fraction is an estimate of the amount of non-crystallizable soft polymer. Conversely, the insoluble fraction can contain an amount of iPP polymer and iPP-EPDM diblock. Since the crystallization and elution of the polymer chain is governed by its longest crystallizable propylene sequence, the diblock copolymer will precipitate along with the iPP polymer. This is verifiable by, e.g., NMR and/or DSC analysis that shows an appreciable, and otherwise unexplainable, amount of ethylene present in the "insoluble" fraction. In a typical separation of an iPP and EPDM rubber blend, the isotactic PP will be cleanly separated by this analysis. The fact that there is "additional" ethylene present in the insoluble fraction, verifies that a fraction of diblock is present. By accounting for the total mass balance of monomer between the fractions, a block composite index can be estimated.

Another indication of the presence of diblock is the increase in molecular weight of the insoluble fractions with the increasing amount of iPP. As the polymer chains are being coordinatively coupled while passing from the first reactor to the second reactor, it is expected that the molecular weight of the polymer will increase.

The Block Composite Index (BCI) is based on showing that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to Equation 1 results in an overall weight % ethylene (in the polymer). This mass balance equation can also be used to quantify the amount of each component in a binary blend or extended to a ternary, or n-component blend.

$$\text{Wt \%} C_{2_{Overall}} = w_{Insoluble}(\text{wt \%} C_{2_{Insoluble}}) + w_{soluble}(\text{wt \%} C_{2_{soluble}}) \quad \text{Eq. 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \%} C_{2_{Overall\,or\,xylene\,insoluble}} = \quad \text{Eq. 2}$$
$$w_{iPPHard}(\text{wt \%} C_{2_{iPP}}) + w_{EPsoft}(\text{wt \%} C_{2_{EPsoft}})$$

$$w_{iPPhard} = \frac{\text{wt \%} C_{2_{overall\,or\,xylene\,insoluble}} - \text{wt \%} C_{2_{EPsoft}}}{\text{wt \%} C_{2_{iPPhard}} - \text{wt \%} C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it may reduce the possibility of and/or prevent the EP block from solubilizing.

In particular, for the Block Composite used herein, the BCI is calculated as shown below in Table 6.

TABLE 6

| Line # | Variable | Source | Block Composite |
|---|---|---|---|
| 1 | Overall wt % C2 Total | Measured | 19.8 |
| 2 | wt % C2 in PP block/polymer | Measured | 0.25 |
| 3 | wt % C2 in EP block/polymer | Measured | 40.8 |
| 4 | wt fraction iPP (in block or polymer) | Calculated | 0.518 |
| 5 | wt fraction EP (in block or polymer) | Calculated | 0.482 |
| 6 | Analysis of HTLC Separation | — | — |
| 7 | wt fraction xylene soluble | Measured | 0.471 |
| 8 | wt fraction xylene insoluble | Measured | 0.529 |
| 9 | wt % C2 in xylene insoluble | Measured | 3.5 |
| 10 | wt fraction PP in insoluble | Calculated | 0.920 |
| 11 | wt fraction EP in insoluble fraction | 1-Line 10 | 0.080 |
| 12 | wt fraction Diblock in insoluble fraction | Line 11/Line 5 | 0.166 |
| 13 | Block Composite Index (BCI) | Calculated | 0.088 |

To estimate the block composite index, the relative amount of each block must be taken into account. To approximate this, the ratio between the EPDM soft and iPP hard is used. The ratio of the EPDM soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EPDM soft is calculated using Equation 2 and assumes the iPP hard contains no ethylene. The weight % ethylene of the EPDM soft is the amount of ethylene present in the xylene soluble fraction.

The term block composite index (BCI) is herein defined to equal the weight percentage of the block copolymer divided by 100% (i.e. weight fraction). The value of the block composite index can range from 0 up to 1, wherein 1 would be equal to 100% of the block copolymer and zero would be for a material such as a traditional blend or random copolymer. For the example described above, the BCI for the Block Composite is 0.088. For the insoluble fraction, the BCI is 1.000, and for the soluble fraction the BCI is assigned a value of zero.

For example, if an iPP-EPDM polymer contains an overall of 47 wt % $C_2$ and is made under the conditions to produce an EPDM soft polymer with 67 wt % $C_2$ and an iPP homopolymer containing zero ethylene, the amount of EPDM soft and iPP hard is 70 wt % and 30 wt %, respectively. If the percent of EPDM is 70 wt % and the iPP is 30 wt %, the relative ratio of the EPDM:iPP blocks could be expressed as 2.33:1. Hence, if one skilled in the art, carries out a xylene extraction of the polymer and recovers 40 wt % insoluble and 60 wt % soluble, this would be an unexpected result and this would lead to the conclusion that a fraction of inventive block copolymer was present. If the ethylene content of the insoluble fraction is subsequently measured to be 25 wt % $C_2$, Equations 2 thru 4 can be solved to account for this additional ethylene and result in 37.3 wt % EPDM soft polymer and 62.7 wt % iPP hard polymer present in the insoluble fraction.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EPDM polymer chain must be connected to an iPP polymer block (or else it would have been extracted into the xylene soluble fraction).

Preparation of Thermoplastic Vulcanizates

The materials principally used are as follows:

| | |
|---|---|
| EPDM 1 | An ethylene-propylene-diene-methylene having an ethylene content of 50 mass % as measured according to ASTM 3900, a diene of ethylidene norbornene content of 7.5 mass % as measured according to ASTM D6047, a remainder of propylene, and a Mooney Viscosity at 125° C. of 65 according to ASTM D1646 (available from The Dow Chemical Company NORDEL ™ 5565). |
| EPDM 2 | An ethylene-propylene-diene having an ethylene content of 50 mass % as measured according to ASTM 3900, an diene of ethylidene norbornene content of 4.9 mass % as measured according to ASTM D6047, and a Mooney Viscosity at 125° C. of 70 according to ASTM D1646 (available from The Dow Chemical Company NORDEL ™ 4570). |
| Polyolefin | A polypropylene homopolymer having a melt flow rate of 0.5 g/10 min as measured according to ASTM D1238 (available as Profax 6823 from LyondellBasell). |
| Oil | A white mineral oil (available as Hydrobrite ® 550 PO from Sonneborn). |
| Phenolic Resin | An octylphenol heat reactive resin, as part of a curative system (available as SP-1045 from SI Group). |
| Tin | Stannous chloride catalyst, as part of the curative system (available as Stannous Chloride Anhydrous from Mason Corporation). |
| Zinc | Zinc oxide, as part of the curative system (available as KADOX ®-911 from Horsehead Corporation). |
| Antioxidant | A stabilizer system (available as Irganox ® B 225 from BASF Corporation). |

Working Examples 1 to 4 and Comparative Example A are prepared according to the approximate formulations below:

TABLE 7

| | Working Example 1 (wt %) | Working Example 2 (wt %) | Working Example 3 (wt %) | Working Example 4 (wt %) | Comparative Example A (wt %) |
|---|---|---|---|---|---|
| Block Composite | 45.0 | 44.3 | 36.8 | 36.3 | — |
| EPDM 1 | 20.3 | 19.9 | 16.6 | 16.4 | — |
| EPDM 2 | — | — | — | — | 42.5 |
| Polyolefin | — | — | — | — | 21.2 |
| Oil | 30.4 | 29.9 | 43.0 | 42.4 | 31.9 |
| Phenolic Resin | 2.4 | 4.0 | 2.0 | 3.3 | 2.5 |
| Tin | 0.7 | 0.7 | 0.6 | 0.6 | 0.7 |
| Zinc | 0.8 | 0.8 | 0.7 | 0.7 | 0.8 |
| Antioxidant | 0.4 | 0.4 | 0.3 | 0.3 | 0.4 |

With reference to Table 7, the amount of Phenolic Resin is increased in Working Example 2 relative to Working Example 1 and Working Example 4 relative to Working Example 3. The amount of Oil is increased (by approximately 42 wt %) in both Working Examples 3 and 4 relative to Working Examples 1 and 2, respectively. Comparative Example A uses a blend of a Polyolefin and EPDM 2 having a lower ENB content (so that an overall ENB content is similar in all the Examples, as in the Working Examples the ENB is derived from both the Block Composite and EPDM 1).

The preparation process for the TPV formulations of Working Examples 1 to 4 and Comparative Example A, according to the formulations in Table 7, is as follows:

(1) The elastomer pellets are imbibed in paraffinic oil in a glass jar at 50° C. for 24 hours to minimize slippage and to reduce mixing time.

(2) A Haake mixer bowl is heated to 190° C.

(3) The mixer is started at 35 rpm.

(4) The oil-imbibed elastomer and the Block Composite (as pellets) or the Polyolefin (Profax 6823, a 0.5 MFR, polypropylene homopolymer available from Lyondell Basell) are added to the mixer.

(5) The materials are mixed for 4 minutes at 75 rpm.

(6) The cure package (Phenolic Resin, Tin chloride, and Zinc oxide) are added to the molten mixture, and mixing is allowed to continue for 3 more minutes.

(7) The Antioxidant is added, and mixing is allowed to continue for one more minute.

(8) The melt is removed from the internal mixer and allowed to further mix on a 2-roll mill at 190° C. The melt is passed through the mixer and the resulting sheet is rolled into a cigar-shaped specimen before being placed end-wise in to and passed through the mill. The procedure is repeated 6 times and then the sample is taken off the mill as a sheet.

(9) The sheet from the mill is preheated in a heated press (190° C.) for two minutes under 2000 psi of pressure. Then, the sheet is compression molded at 190° C. under 55000 psi of pressure for 4 minutes and cooled for 4 minutes with 55000 psi of pressure. This procedure produces test plaques with from 1/16 inch to 1/8 inch thickness.

Referring to Table 8, below, the Shore A hardness, tensile properties, compression set, and tear strength are measured for samples of each of Examples 1 and 2 and Comparative Examples A and B.

TABLE 8

|  | Working Example 1 | Working Example 2 | Working Example 3 | Working Example 4 | Comparative Example A |
|---|---|---|---|---|---|
| Shore A Hardness | 62 | 61 | 52 | 56 | 60 |
| Compression Set at 22 hours at 70° C. (%) | 45 | 43 | 42 | 36 | 55 |
| Compression Set at 70 hours at 120° C. (%) | 74 | 70 | 66 | 57 | 79 |
| 100% Modulus (MPa) | 316 | 322 | 226 | 271 | 289 |
| Tensile Strength at Break (%) | 708 | 735 | 397 | 563 | 424 |
| Elongation at Break (%) | 431 | 415 | 285 | 311 | 286 |

Working Examples 1 to 4 show significant improvements over Comparative Example A, e.g., with respect to compression set. As shown the process of the manufacturing a TPV may be simplified and/or resultant properties improved by using the Block Composite described herein. For example, referring to Table 8, the Shore A hardness is comparable for Working Examples 1 to 2 and 4 and Comparative Example A. Further, a significant improvement is seen for Working Examples 1, 2, and 4 with respect to compression set (which indicates better elastic recovery) and tensile strength in comparison to Comparative Example A, respectively.

What is claimed is:

1. A thermoplastic vulcanizate composition, comprising:
   (A) greater than 15 wt % of a block composite that includes
      (i) an ethylene/alpha-olefin/diene interpolymer, the alpha-olefin being an alpha-olefin monomer having from 3 to 10 carbon atoms, and the diene being a diene monomer having from 2 to 25 carbon atoms,
      (ii) a propylene based polymer, and
      (iii) a block copolymer comprising a soft block and a hard block, the soft block having the same composition as the ethylene/alpha-olefin/diene polymer, and the hard block having the same composition as the propylene based polymer; and
   (B) a remainder of a curative system and optionally at least one of a vulcanizable elastomer and an oil,
      wherein the thermoplastic vulcanizate composition excludes any additional thermoplastic polyolefin.

2. The thermoplastic vulcanizate composition as claimed in claim 1, wherein the amount of the block composite is greater than 25 wt % and up to 70 wt %, based on the total weight of the thermoplastic vulcanizate composition.

3. The thermoplastic vulcanizate composition as claimed in claim 1, further comprising the oil.

4. The thermoplastic vulcanizate composition as claimed in claim 3, wherein an amount of the block composite is from 25 wt % to 70 wt %, an amount of the oil is from 1 wt % to 70 wt %, and an amount of the curative system is from 0.1 w % to 10.0 wt %, based on the total weight of the thermoplastic vulcanizate composition.

5. The thermoplastic vulcanizate composition as claimed in claim 3, further comprising a vulcanizable elastomer, wherein an amount of the block composite is from 25 wt % to 70 wt %, an amount of the vulcanizable elastomer is from 1 wt % to 50 wt %, an amount of the oil is from 20 wt % to 70 wt %, and an amount of the curative system is from 0.1 wt % to 10.0 wt %, based on the total weight of the thermoplastic vulcanizate composition.

6. The thermoplastic vulcanizate composite as claimed in claim 5, wherein the amount of the block composite is from 25 wt % to 55 wt %, the amount of the vulcanizable elastomer is from 10 wt % to 25 wt %, an amount of the oil is from 20 wt % to 50 wt %, and an amount of the curative system is from 0.1 wt % to 10.0 wt %, based on the total weight of the thermoplastic vulcanizate composition.

7. The thermoplastic vulcanizate composite as claimed in claim 1, wherein the amount of the block composite includes from 15 wt % to 70 wt % of the ethylene/alpha-olefin/diene interpolymer, from 15 wt % to 70 wt % of the propylene based polymer, and from 5 wt % to 50 wt % of the block copolymer.

8. The thermoplastic vulcanizate composition as claimed in claim 1, wherein a block composite index of the block composite is from 0.050 to 0.300.

9. The thermoplastic vulcanizate composition as claimed in claim 1, wherein the ethylene/alpha-olefin/diene interpolymer is an ethylene-propylene-diene rubber and the soft block is an ethylene-propylene-diene rubber block.

10. The thermoplastic vulcanizate composition as claimed in claim 1, wherein the propylene based polymer is isotactic polypropylene and the hard block is an isotactic polypropylene block.

* * * * *